United States Patent
Zhou

(10) Patent No.: US 12,427,859 B1
(45) Date of Patent: Sep. 30, 2025

(54) DRIVE MECHANISM OF GEARBOX IN REMOTE-CONTROLLED CAR

(71) Applicant: Dongguan Hobby Plus RC Technology Co., Ltd, Dongguan (CN)

(72) Inventor: Ruiyuan Zhou, Dongguan (CN)

(73) Assignee: Dongguan Hobby Plus RC Technology Co., Ltd, Dongguan (CN)

( * ) Notice: Subject to any disclaimer, the term of this patent is extended or adjusted under 35 U.S.C. 154(b) by 0 days.

(21) Appl. No.: 18/812,088

(22) Filed: Aug. 22, 2024

(30) Foreign Application Priority Data

Aug. 3, 2024 (CN) .......................... 202421876638.7

(51) Int. Cl.
*B60K 17/35* (2006.01)
*B60K 17/02* (2006.01)

(52) U.S. Cl.
CPC .......... *B60K 17/3515* (2013.01); *B60K 17/02* (2013.01)

(58) Field of Classification Search
CPC .. B60K 17/34; B60K 17/344; B60K 17/3515; B60K 17/02; F16H 3/089
See application file for complete search history.

(56) References Cited

U.S. PATENT DOCUMENTS

| 4,356,879 A * | 11/1982 | Uchiyama ............. B60W 10/02 180/247 |
| 11,512,614 B2 | 11/2022 | Imafuku |
| 2007/0131045 A1* | 6/2007 | Bennett ................ B60K 17/344 74/325 |
| 2015/0266374 A1 | 9/2015 | Downs et al. |

FOREIGN PATENT DOCUMENTS

| CN | 220302691 U | 1/2024 |
| CN | 220505739 U | 2/2024 |

* cited by examiner

*Primary Examiner* — Jason D Shanske
*Assistant Examiner* — Matthew James O'Neill

(57) ABSTRACT

A drive mechanism of a gearbox in a remote-controlled car includes a transfer assembly and drive-switching components; the transfer assembly includes a first shaft and a second shaft arranged in parallel. A first transmission gear and a second transmission gear are rotatably sheathed outside the first shaft; the drive-switching components includes a clamping member and a driving assembly; the driving assembly drives the clamped member to move back and forth so as to be clamped with the first transmission gear, or the first transmission gear and the second transmission gear; when the clamping member is merely clamped with the first transmission gear, the first shaft rotates independently for a two-drive output; when the clamping member is clamped with the first transmission gear and the second transmission gear, the first shaft and the second shaft rotate simultaneously for a four-wheel drive output.

10 Claims, 5 Drawing Sheets

DRIVE MECHANISM OF GEARBOX IN REMOTE-CONTROLLED CAR

CROSS REFERENCE TO RELATED APPLICATION

This application claims priority to Chinese patent application No. 202421876638.7, filed with the China National Intellectual Property Administration on Aug. 3, 2024 and entitled "drive mechanism of gearbox in remote-controlled car", which is incorporated herein by reference in its entirety.

FIELD OF THE INVENTION

The present disclosure relates to the technical field of the drive mechanism, particularly, to a drive mechanism of a gearbox in a remote-controlled car.

BACKGROUND OF THE INVENTION remote-controlled cars are usually used in complex road conditions, and a single driving method for remote-controlled cars cannot meet the needs of different road conditions. Therefore, the existing gearbox in the remote-controlled cars can switch back and forth between two-wheel drive mode and four-wheel drive mode, for example, when driving in complex road conditions, the remote-controlled cars can switch to four-wheel drive mode to maintain stable driving; when turning, the remote-controlled cars can switch to two-wheel drive mode to make the turning radius smaller, which is beneficial for the remote-controlled model car to turn and meet the usage scenarios of the remote-controlled model car and the owner of the remote-controlled car needs. However, the existing gearbox in the remote-controlled cars has a complex structure that switches back and forth between the two-wheel drive model and the four-wheel drive model, which is not conducive to production and processing.

SUMMARY OF THE INVENTION

The object of the present disclosure is to provide a drive mechanism of a gearbox in a remote-controlled car to overcome the technical problems in the prior art.

To achieve the above object, the present disclosure provides a drive mechanism of a gearbox in a remote-controlled car, which includes a transfer assembly and drive-switching components.

The transfer assembly includes a first shaft and a second shaft arranged in parallel. A first transmission gear and a second transmission gear are rotatably sheathed outside the first shaft. A gear is fixed sheathed on the second shaft, and the gear meshes with the second transmission gear.

The drive-switching components include a clamping member and a driving assembly. The clamping member is slidably sheathed outside the first shaft and drives the first shaft to rotate when rotating. The driving assembly drives a clamping member to move back and forth along the first shaft so as to be clamped with the first transmission gear, or the first transmission gear and the second transmission gear. When the clamping member is merely clamped with the first transmission gear, the first shaft rotates independently for a two-wheel drive output. When the clamping member is clamped with the first transmission gear and the second transmission gear, the first shaft and the second shaft rotate simultaneously for a four-wheel drive output.

Optionally, the driving assembly includes a driving member, a shift lever, and a fork. The shift lever is paralleled with the first shaft, one end of the fork is fixed sheathed outside the shift lever, the other end of the fork is a U-shaped connecting part, and the peripheral wall of the clamping member is provided with a circular slot; the U-shaped connecting part is inserted into the circular slot and rotates relative to the clamping member, the driving member is connected to the shift lever to drive the shift lever to move back and forth along its axial direction, thereby driving the clamping member to move back and forth along the first shaft.

Optionally, the output end of the driving member is provided with an eccentric part, which is rotatably connected to one end of a connecting rod, and the other end of the connecting rod is rotatably connected to one end of the shift lever.

Optionally, one end of the clamping member is provided with at least one embedding block, one side of the first transmission gear close to the embedding block is provided with at least one first insertion slot penetrating through the first transmission gear, one side of the second transmission gear close to the first transmission gear is provided with at least a second insertion slot. At least one second insertion slot is arranged corresponding to at least one first insertion slot. At least one embedding block is inserted into at least one insertion slot to clamp with the first transmission gear, or inserted into both at least one first insertion slot and at least one second insertion slot to clamp with the first transmission gear and the second transmission gear.

Optionally, one end of the clamping member is annularly provided with a plurality of the embedding blocks, the first transmission gear is annularly provided with a plurality of the first insertion slots, the second transmission gear is annularly provided with a plurality of the second insertion slots, and the plurality of the embedding blocks, the plurality of the first insertion slots and the plurality of the second insertion slots are arranged in one-to-one correspondence.

Optionally, a middle of the first shaft is provided with a non-circular portion, the center of the clamping member is penetrated with a non-circular hole. The non-circular hole is slidably sheathed outside the non-circular portion.

Optionally, the drive mechanism of the gearbox in remote-controlled car also includes a driving unit and a transmission assembly. The driving unit is in transmission connection with the first transmission gear through the transmission assembly for driving the first transmission gear to rotate.

Optionally, the transmission assembly is a gear set, and the center of the driving gear of the gear set is fixedly connected to the output end of the driving unit. The driven gear of the gear set is meshed and connected to the first transmission gear.

Optionally, the transmission assembly includes the driving gear, a first double-layer gear, a second double-layer gear, a third double-layer gear, a driven gear, and a gear shaft. The center of the driving gear is fixedly arranged at an output end of the driving unit, the gear shaft is arranged in parallel to the second shaft, the first double-layer gear and the third double-layer gear are both rotatably sheathed outside the gear shaft, and the second double-layer gear and the driven gear are both rotatably sheathed outside the second shaft. The large gear of the first double-layer gear meshes with the driving gear, the pinion of the first double-layer gear meshes with the large gear of the second double-layer gear, the pinion of the second double-layer gear meshes with the large gear of the third double-layer gear, the pinion of the third double-layer gear is meshed with the driven gear, and the driven gear is meshed with the first transmission gear.

Optionally, the drive mechanism of a gearbox in remote-controlled car also includes a case. The transmission assembly is contained in the case. The driving unit is arranged outside the case and the output end of the driving unit passes through the case to connect the transmission assembly. The first shaft and the second shaft are both rotatably connected in the case, and at least one end of the first shaft and at least one end of the second shaft extend out of the case.

Compared with the prior art, the above one or more technical schemes about the drive mechanism of a gearbox in remote-controlled car provided by the embodiments of the present disclosure have at least one of the following technical effects:

When the driving assembly drives the clamping member to move along the first shaft to clamp the first transmission gear, the first transmission gear rotates and drives the first shaft to rotate independently by the clamping member, thereby achieving two-wheel drive output, that is the two-wheel drive mode, which can be the front drive-mode or the rear drive-mode. When producing the remote-controlled cars, the power of the first shaft can be sent to the front or rear wheels according to the actual assembly requirements of the frame.

When the drive member drives the clamping member to move along the first shaft to clamp both the first transmission gear and the second transmission gear, the first transmission gear rotates to drive the first shaft and the second transmission gear to rotate simultaneously by the clamping member, the second transmission gear drives the second shaft to rotate by the gear so that the first shaft and the second shaft rotate simultaneously, thereby, achieving four-wheel drive output, that is the four-wheel drive model. When producing the remote-controlled cars, one of the powers of the first shaft or the second shaft can be sent to the front wheels, and the other thereof can be sent to the rear wheels according to the actual assembly requirements of the frame.

Therefore, the drive mechanism of a gearbox in remote-controlled car can be switched between the two-wheel mode and four-wheel mode, which is suitable for different usage scenarios and enhances the user experience. Its overall structure is simple, compact, and small in size, which is not only conducive to production and processing but also better meets market demand.

BRIEF DESCRIPTION OF THE DRAWINGS

In order to more clearly illustrate the technical schemes in the embodiments in the present invention, the drawings needed in the embodiments or the prior technical description are simple introduced below, obviously, the drawings described below are only some embodiments in the present invention, and for those skilled in the art, additional drawings may be obtained without creative labor.

EMBODIMENTS

Embodiments of the present invention are described in detail below, and examples of the embodiments are shown in the attached drawings, in which the same or similar labels represent the same or similar elements or elements with the same or similar function. The embodiments described below by reference to the attached drawings are exemplary and are intended to explain embodiments of the present invention and cannot be understood as limits in the present invention.

In the description of the embodiments of the present invention, it should be understood that if the embodiments involve directional indications, such as the "upper", "lower", "left", "right", "front", "rear", "internal" and "external", etc. indicating orientation or location relationship, is based on the orientation or position relationship shown in the figures, it is only for describing the embodiments in the present invention and simplifying the description, rather than indicating or implying the device or the element that must have a specified azimuth, constructed and operated, it cannot be understood as a limitation on the present invention.

Further, the terms "first", and "second" are used only for description purposes and cannot be understood as indicating or implying relative importance or implicitly indicating the number of technical features indicated. Thus, features defining "first "and "second" may expressly or implicitly include one or more of the features. In the description of the embodiments of the present invention, the "plurality of" means two or more unless otherwise specifically limited.

In the embodiments of the present invention, unless otherwise specified and defined, the terms "installation", "connection", "connection", "fixation" and other terms shall be understood in a broad sense, for example, they can be fixed connection, detachable connection, or integrated; It may be a mechanical connection or an electrical connection; It can be directly connected or indirectly connected through an intermediate medium. It can be the connection between two elements or the interaction between two elements. For those skilled in the art, the specific meanings of the above terms in the embodiments of the present invention can be understood according to specific circumstances.

In one embodiment in the present disclosure, referring to FIGS. 1-5, a drive mechanism of a gearbox in a remote-controlled car includes a transfer assembly 100 and drive-switching components 200.

Figure 2:
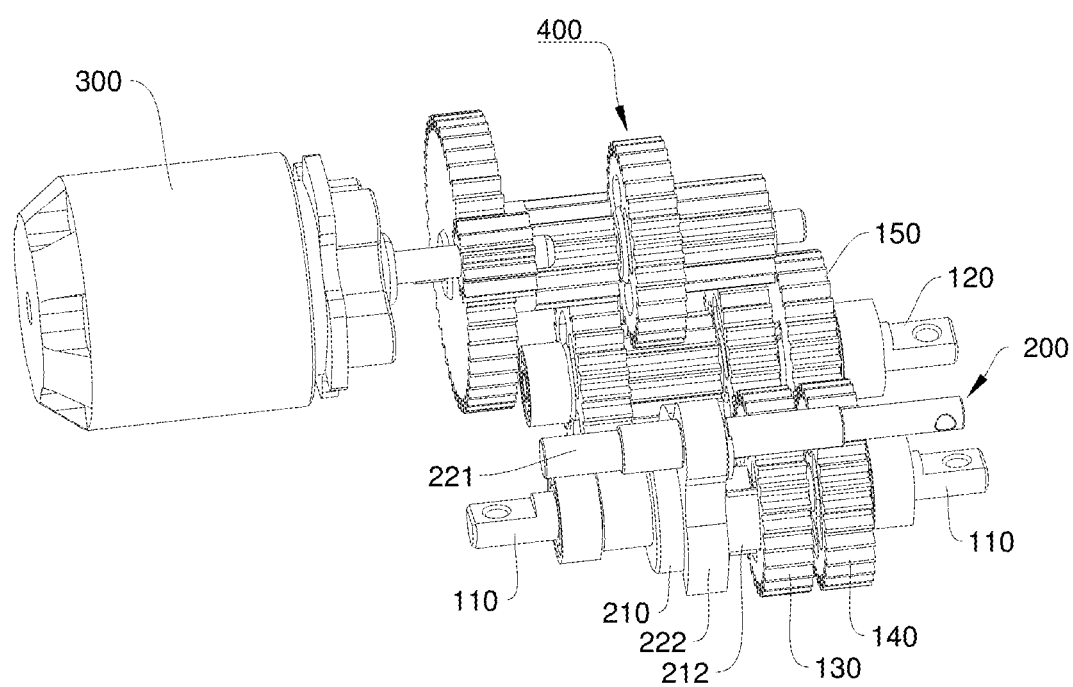
FIG. 2 is a schematic diagram of the case of the drive mechanism of a gearbox in a remote-controlled car according to an embodiment in the present invention.
Figure 3:
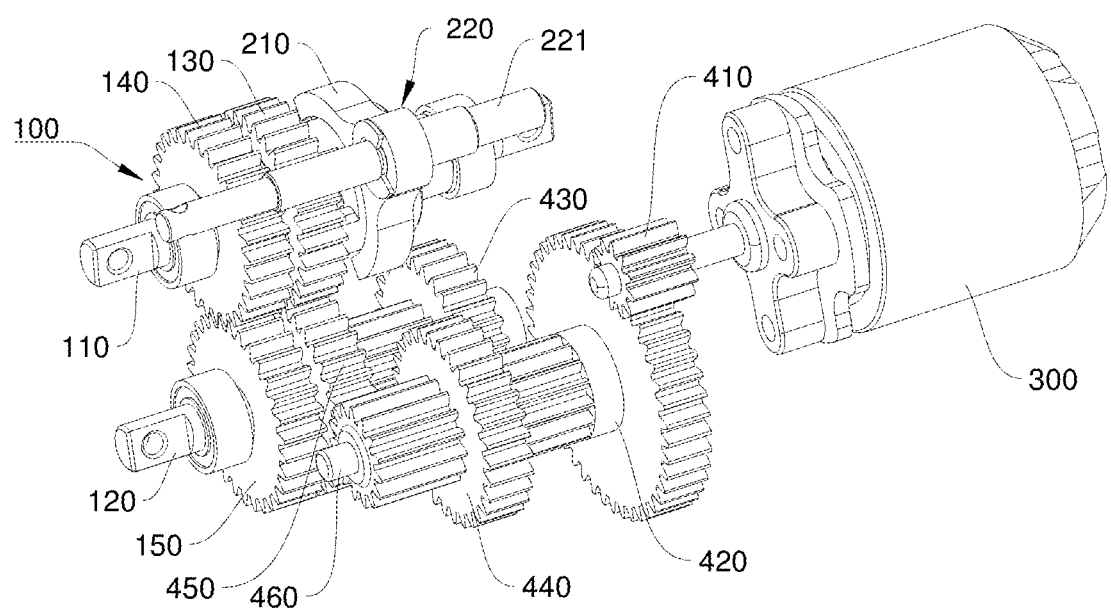
FIG. 3 is the other schematic diagram of the case of the drive mechanism of a gearbox in a remote-controlled car according to an embodiment in the present invention.

Referring to FIGS. 2-3, the transfer assembly 100 includes a first shaft 110 and a second shaft 120 arranged in parallel. The first transmission gear 130 and a second transmission gear 140 are rotatably sheathed outside the first shaft 110. And the gear 150 is fixedly sheathed outside the second shaft 120, and the gear 150 meshes with the second transmission gear 140.

Referring to FIGS. 2-3, the drive-switching components 200 includes a clamping member 210 and a driving assembly 220. The clamping member 210 is slidably sheathed outside the first shaft 110 and drives the first shaft 110 to rotate when rotating, and the driving assembly 220 drives the clamping member 210 to move back and forth along the first shaft 110 to be clamped with the first transmission gear 130, or the first transmission gear 130 and the second transmission gear 140. When the clamping member 210 is merely clamped with the first transmission gear 130, the first shaft 110 rotates independently for a two-wheel drive output. When the clamping member 210 is clamped with the first transmission gear 130 and the second transmission gear 140, the first shaft 110 and the second shaft 120 rotate simultaneously for a four-wheel drive output.

Compared with the prior art, the above one or more technical schemes about the drive mechanism of a gearbox in remote-controlled car provided by the embodiments of the present disclosure have at least one of the following technical effects:

Referring to FIGS. 2-3, when the driving assembly 220 drives the clamping member 210 to move along the first shaft 110 to clamp the first transmission gear 130, the first transmission gear 130 rotates and drives the first shaft 110 to rotate independently by the clamping member 210, thereby achieving two-wheel drive output, that is the two-wheel drive mode, which can be the front drive-mode or the rear drive-mode. When producing the remote-controlled cars, the power of the first shaft 110 can be sent to the front or rear wheels according to the actual assembly requirements of the frame.

Referring to FIGS. 2-3, when the drive member 220 drives the clamping member 210 to move along the first shaft 110 to clamp both the first transmission gear 130 and the second transmission gear 140, the first transmission gear 130 rotates to drive the first shaft 110 and the second transmission gear 140 to rotate simultaneously by the clamping member 210, the second transmission gear 140 drives the second shaft 120 to rotate by the gear 150 so that the first shaft 110 and the second shaft 120 rotate simultaneously, thereby achieving four-wheel drive output, that is the four-wheel drive model. When producing the remote-controlled cars, one of the powers of the first shaft 110 or the second shaft 120 can be sent to the front wheels, the other thereof can be sent to the rear wheels according to the actual assembly requirements of the frame.

Therefore, the drive mechanism of a gearbox in remote-controlled car can be switched between the two-wheel mode and four-wheel mode, which is suitable for different usage scenarios and enhances the user experience. Its overall structure is simple, compact, and small in size, which is not only conducive to production and processing but also better meets market demand.

Figure 4:
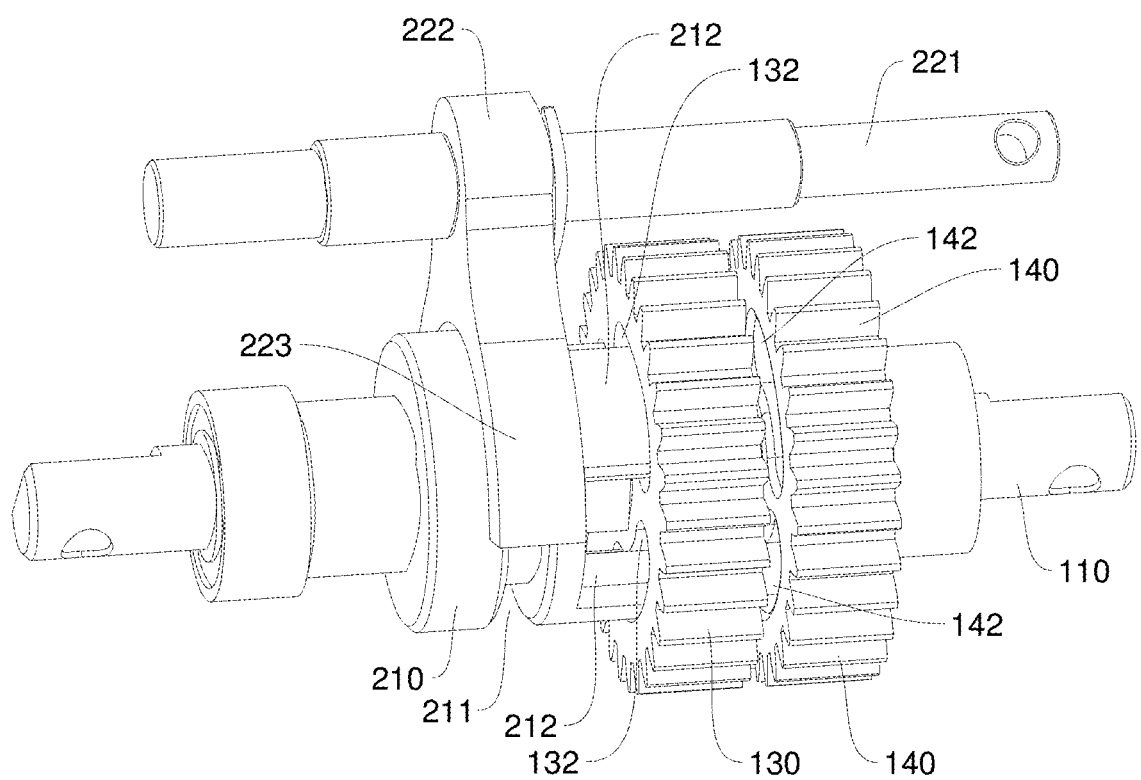
FIG. 4 is a partial structural schematic diagram of the case of the drive mechanism of a gearbox in a remote-controlled car according to an embodiment in the present invention.
Figure 5:
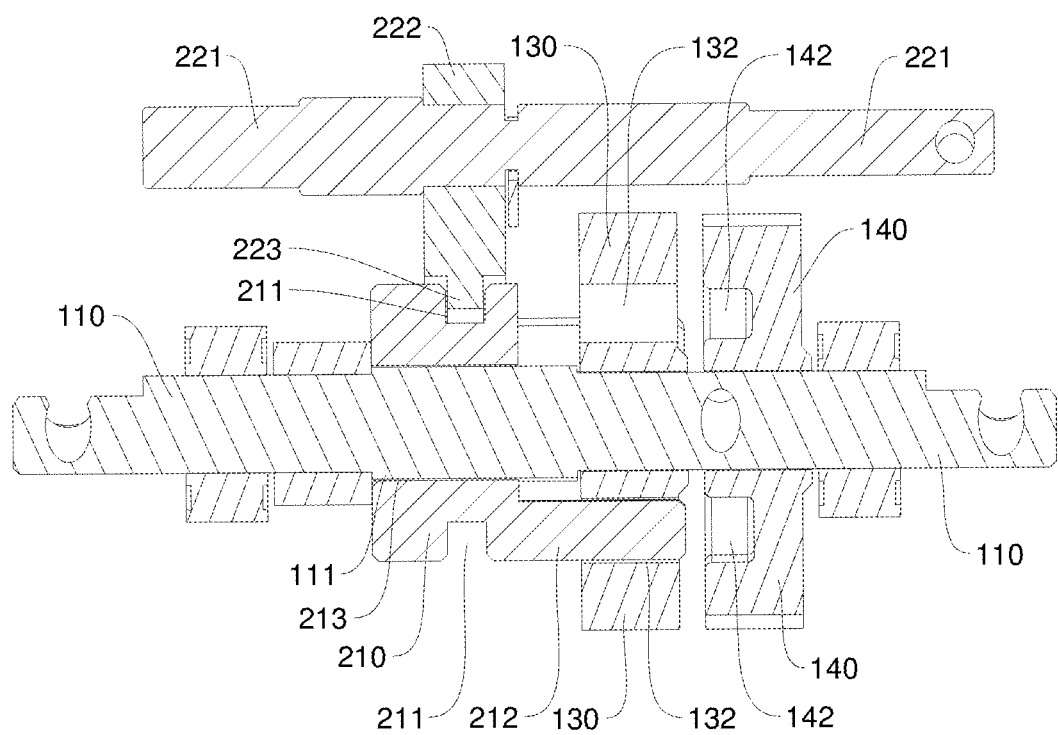
FIG. 5 is an in-section view of FIG. 4

In the other embodiments, referring to FIGS. 4-5, the driving assembly 220 includes a driving member (not shown), a shift lever 221, and a fork 222. The shift lever 221 is paralleled with the first shaft 110, one end of the fork 222 is fixed sheathed outside the shift lever 221, the other end of the fork 222 is a U-shaped connecting part 223, and the peripheral wall of the clamping member 210 is provided with a circular slot 211. The U-shaped connecting part 223 is inserted into the circular slot 211 and can rotate relative to the clamping member 210, that is, the clamping member 210 can rotate relative to the U-shaped connecting part 223 when rotating. The driving member is connected to the shift lever 221 to drive the shift lever 221 to move back and forth along its axial direction, thereby driving the clamping member 210 to move back and forth along the first shaft 110. Specifically, the driving member drive the shift lever 221 to move back and forth along its axial direction, thereby driving the fork 222 to move back and forth, then the U-shaped connecting part 223 drives the clamping member 210 to move back and forth along the first shaft 110 so that the clamping member 210 is clamped with the first transmission gear 130, or the first transmission gear 130 and the second transmission gear 140.

Further, the output end of the driving member (not shown) is provided with an eccentric part, which is rotatably connected to one end of a connecting rod, and the other end of the connecting rod is rotatably connected to one end of the shift lever 221. During operation, the driving member drives the eccentric part to rotate back and forth around the output end of the driving member, and the eccentric part drives the shift lever 221 to move back and forth along its axial direction (parallel to the circumferential direction of the first shaft 110) through the connecting rod. Among them, the driving member can be a servo motor.

In some other embodiments, the drive member can be a power device such as a cylinder or a linear module, as long as it can drive the shift lever 221 to move back and forth along its axial direction and is not limited here.

In another embodiment, referring to FIGS. 3-5, one end of the clamping member 210 is provided with at least one embedding block 212, one side of the first transmission gear 130 close to the embedding block 212 is provided with at least one first insertion slot 132 penetrating through the first transmission gear 130, one side of the second transmission gear 140 close to the first transmission gear 130 is provided with at least a second insertion slot 142. At least one second insertion slot 142 is arranged corresponding to at least one first insertion slot 132. At least one embedding block 212 is inserted into at least one first insertion slot 132 to clamp with the first transmission gear 130, or inserted into both at least one first insertion slot 132 and at least one second insertion slot 142 to clamp with the first transmission gear 130 and the second transmission gear 140.

Specifically, in the two-wheel drive mode, the embedding block 212 is only inserted into the first insertion slot 132 to be clamped with the first transmission gear 130, such that the first shaft 110 independently rotates to perform two-wheel drive output.

When switching from the two-wheel drive mode to the four-wheel drive mode, the driving assembly 220 is pulled and pushed to drive the embedding block 212 of the clamping member 210 to move towards the second insertion slot 142 and insert therein, at this time, the embedding block 212 simultaneously insert into the first insertion slot 132 and the second insertion slot 142, thereby being clamped with the first transmission gear 130 and the second transmission gear 140, so that the first shaft 110 and the second shaft 120 rotate simultaneously to perform four-wheel drive output. When switching the four-wheel from drive mode to the two-wheel drive mode, the driving assembly 220 is pulled and pushed to drive the embedding block 212 of the clamping member 210 to move away from the second insertion slot 142 and out of the second insertion slot 142 such that the embedding block 212 of the clamping member 210 is inserted only into the first insertion slot 132. Therefore, the structure of the drive mechanism of a gearbox in remote-controlled car in the present disclosure switching back and forth between the two-wheel drive mode and the four-wheel drive mode is simple and is conducive to production and processing.

Further, referring to FIGS. 4-5, one end of the clamping member 210 is annularly provided with a plurality of the embedding blocks 212, the first transmission gear 130 is annularly provided with a plurality of the first insertion slots 132, the second transmission gear 140 is annularly provided with a plurality of the second insertion slots 142, and the plurality of the embedding blocks 212, the plurality of the first insertion slots 132 and the plurality of the second insertion slots 142 are arranged in one-to-one correspondence. By means of the plurality of the embedding blocks 212 being clamped with the plurality of the first insertion slots 132 and/or the plurality of the second insertion slots 142, the connection is firm, and it is not easy to shake when moving.

Preferably, referring to FIGS. 4-5, the cross-sections of the first insertion slot 132 and the second insertion slot 142 are both larger than the cross-section of the embedding block 212, which facilitates the insertion of the embedding block 212 into the first insertion slot 132 and/or the second insertion slot 142.

Further, referring to FIG. 5, a middle of the first shaft 110 is provided with a non-circular portion 111, the center of the clamping member 210 is penetrated with a non-circular hole 213. The non-circular hole 213 is slidably sheathed outside the non-circular portion 111, so that the clamping member 210 can move back and forth along the circumference of the first shaft 110 on the non-circular portion 111 under external force (such as the fork 222), and the clamping member 210 can also drive the first shaft 110 to rotate when rotating.

In the other embodiment, referring to FIGS. 2-3, the drive mechanism of the gearbox in remote-controlled car also includes a driving unit 300 and a transmission assembly 400. The driving unit 300 is in transmission connection with the first transmission gear 130 through the transmission assembly 400 for driving the first transmission gear 130 to rotate.

In some embodiments, referring to FIGS. 2-3, the transmission assembly 400 is a gear set, and the center of the driving gear 410 of the gear set is fixedly connected to the output end of the driving unit 300. The driven gear 450 of the gear set is meshed and connected to the first transmission gear 130 so that the driving unit 300 drives the first transmission gear 130 to rotate through the gear set.

In the embodiments, referring to FIGS. 2-3, the transmission assembly 400 includes the driving gear 410, a first double-layer gear 420, a second double-layer gear 430, a third double-layer gear 440, a driven gear 450, and a gear shaft 460. The center of the driving gear 410 is fixedly arranged at an output end of the driving unit 300, the gear shaft 460 is arranged in parallel to the second shaft 120, the first double-layer gear 420 and the third double-layer gear 440 are both rotatably sheathed outside the gear shaft 460, and the second double-layer gear 430 and the driven gear 450 are both rotatably sheathed outside the second shaft 120. The large gear of the first double-layer gear 420 meshes with the driving gear 410, the pinion of the first double-layer gear 420 meshes with the large gear of the second double-layer gear 430, the pinion of the second double-layer gear 430 meshes with the large gear of the third double-layer gear 440, the pinion of the third double-layer gear 440 meshes with the driven gear 450, and the driven gear 450 meshes with the first transmission gear 130. Specifically, the driving unit 300 drives the driving gear 410 to rotate, the driving gear 410 drives the driven gear 450 through the first double-layer gear 420, the second double-layer gear 430, and the third double-layer gear 440, and the driven gear 450 drives the first transmission gear 130 to rotate.

Figure 1:
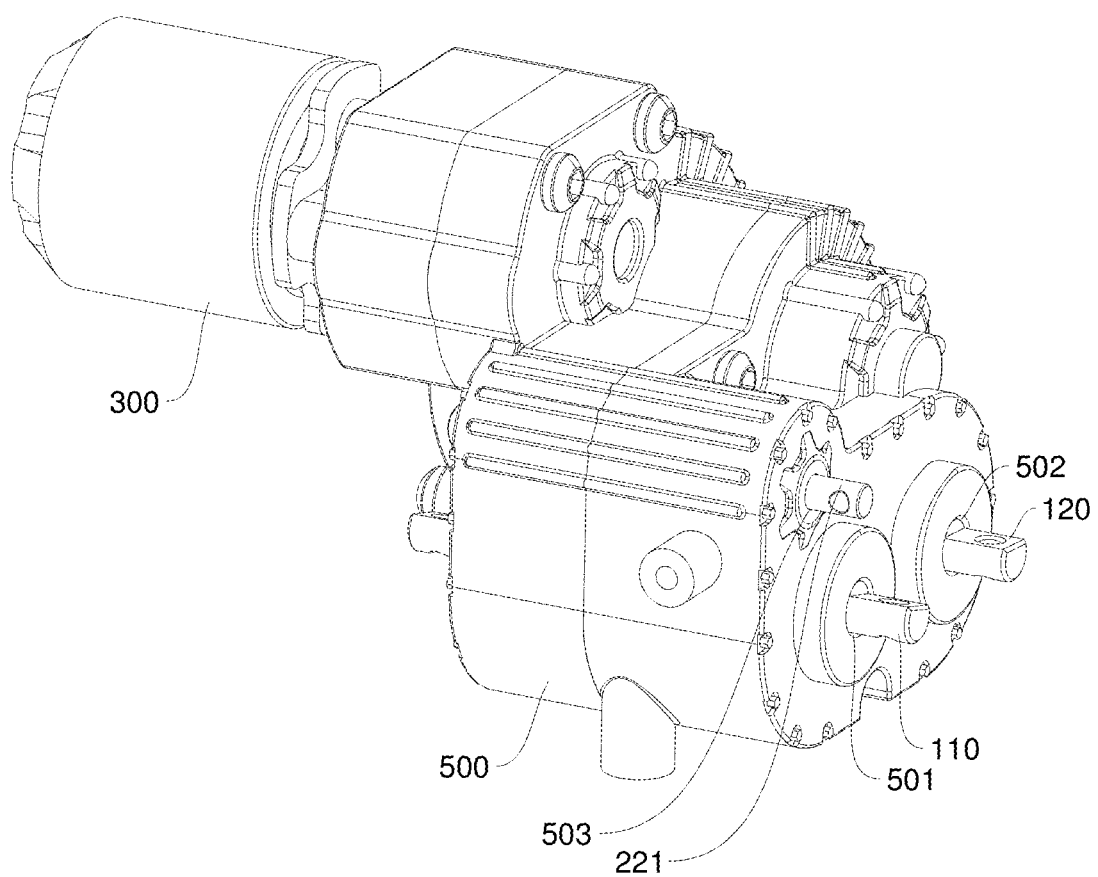
FIG. 1 is a schematic diagram of the drive mechanism of a gearbox in a remote-controlled car according to an embodiment in the present invention.

In another embodiment, referring to FIGS. 1-2, the drive mechanism of a gearbox in remote-controlled car also includes a case 500. The transmission assembly 400 is contained in the case 500. The driving unit 300 is arranged outside the case 500 and the output end of the driving unit 300 passes through the case 500 to connect the transmission assembly 400. The first shaft 110 and the second shaft 120 are both rotatably connected in the case 500, and at least one end of the first shaft 110 and at least one end of the second shaft 120 extend out of the case 500, so that the first shaft 110 and the second shaft 120 can output power. Preferably, two ends of the first shaft 110 rotatably connect with two opposite side walls of the case 500 via bearings, and two ends of the second shaft 120 also rotatably connect with two opposite side walls of the case 500 via bearings, so that the first shaft 110 and the second output shaft 120 are stably rotatably mounted in the case 500.

Referring to FIGS. 1-2, the two opposite side walls of the case 500 are both provided with a first through-hole 501 and a second through-hole 502, the two ends of the first shaft 110 respectively pass through the two first through-holes 501, the two ends of the second shaft 120 respectively pass through the two second through-holes 502.

Referring to FIGS. 1-2, at least one end of the shift lever 221 extends out of the case 500, and the end of the shift lever 221 extending out of the case 500 is used for transmission connection with the driving member. Two opposite side walls of the case 500 are both provided with a third through hole 503, and the two ends of the shift lever 221 are respectively penetrated through the two third through holes 503.

Referring to FIGS. 1-2, the drive unit 300 may be an electric motor. The electric motor is fixedly mounted on an outer wall of the case 500 by means of a plurality of screws, so as to facilitate disassembly and assembly. An output end of the electric motor passes through the case 500 and is connected to the transmission assembly 400.

Two opposite side walls of the case 500 are both provided with an insertion hole (not shown), and two ends of the gear shaft 460 are respectively inserted into the two insertion holes, so that the gear shaft 460 is stably rotatably installed in the case 500.

The case 500 may be formed by combining a plurality of shells. Two adjacent shells are detachably connected by a plurality of screws. The case 500 is configured as a combined structure of a plurality of shells, so that the transfer assembly 100, the switching assembly 200, the driving unit 300, and the transmission assembly 400 can be conveniently installed.

The drive mechanism of a gearbox in remote-controlled car can be applied to remote-controlled model vehicles of types such as a 1/12 climbing vehicle, a 1/14 climbing vehicle, a 1/16 climbing vehicle, a 1/18 climbing vehicle, a 1/24 climbing vehicle, a 1/32 climbing vehicle, a 1/64 climbing vehicle, a 1/5 racing vehicle, a 1/8 racing vehicle, a 1/10 racing vehicle, a 1/12 racing vehicle, a 1/14 racing vehicle, a 1/16 racing vehicle, a 1/18 racing vehicle, a 1/24 racing vehicle, a 1/28 racing vehicle, a 1/32 racing vehicle and a 1/64 racing vehicle, No limitation will be set here.

Other parts of this embodiment are the same as those of the first embodiment, and features that are not explained in this embodiment are explained in the first embodiment, and will not be repeated here.

The present disclosure is described in further detail with reference to specific preferred embodiments, and it cannot be determined that the specific implementation of the present disclosure is only limited to these descriptions. For a person of ordinary skill in the art to which the present disclosure belongs, on the premise of not departing from the concept of the present disclosure, the architecture form of the present disclosure can be flexible and varied, and a series of products can be derived. Only a few simple deductions or replacements should be considered as belonging to the scope of protection defined by the claims as filed.

The invention claimed is:

1. A drive mechanism of a gearbox in a remote-controlled car, comprising a transfer assembly and drive-switching components; wherein said transfer assembly includes a first shaft and a second shaft arranged in parallel; a first transmission gear and a second transmission gear are rotatably sheathed outside said first shaft; a gear is fixed sleeved on said second shaft, and said gear meshes with said second transmission gear; said drive-switching components includes a clamping member and a driving assembly; said clamping member is slidably sheathed outside said first shaft and drives said first shaft to rotate when rotating, and said driving assembly drives said clamping member to move back and forth along said first shaft so as to be clamped with said first transmission gear, or said first transmission gear and said second transmission gear; when said clamping member is merely clamped with said first transmission gear, said first shaft rotates independently for a two-drive output; when said clamping member is clamped with said first transmission gear and said second transmission gear, said first shaft and said second shaft rotate simultaneously for a four-wheel drive output.

2. The drive mechanism of a gearbox in a remote-controlled car according to claim 1, wherein said driving assembly includes a driving member, a shift lever, and a fork; said shift lever is paralleled with said first shaft, one end of said fork is fixed sheathed outside said shift lever, the other end of said fork is a U-shaped connecting part, and a peripheral wall of said clamping member is provided with a circular slot; said U-shaped connecting part is inserted into said circular slot and rotates relative to said clamping member, said driving member is connected to said shift lever to drive said shift lever to move back and forth along an axial direction thereof, thereby driving said clamping member to move back and forth along said first shaft.

3. The drive mechanism of a gearbox in a remote-controlled car according to claim 2, wherein an output end of said driving member is provided with an eccentric part, which is rotatably connected to one end of a connecting rod, and the other end of said connecting rod is rotatably connected to one end of said shift lever.

4. The drive mechanism of a gearbox in a remote-controlled car according to claim 1, wherein one end of said clamping member is provided with at least one embedding block, one side of said first transmission gear close to said embedding block is provided with at least one first insertion slot penetrating through said first transmission gear, one side of said second transmission gear close to said first transmission gear is provided with at least a second insertion slot; at least one second insertion slot is arranged corresponding to at least one first insertion slot; at least one embedding block is inserted into at least one first insertion slot to clamp with said first transmission gear or inserted into both at least one first insertion slot and at least one second insertion slot to clamp with said first transmission gear and said second transmission gear.

5. The drive mechanism of a gearbox in a remote-controlled car according to claim 4, wherein one end of said clamping member is annularly provided with a plurality of said embedding blocks, said first transmission gear is annularly provided with a plurality of said first insertion slots, said second transmission gear is annularly provided with a plurality of said second insertion slots, and said plurality of said embedding blocks, said plurality of said first insertion slots and said plurality of said second insertion slots are arranged in one-to-one correspondence.

6. The drive mechanism of a gearbox in a remote-controlled car according to claim 1, wherein a middle of said first shaft is provided with a non-circular portion, a center of said clamping member is penetrated with a non-circular hole; said non-circular hole is slidably sheathed outside said non-circular portion.

7. The drive mechanism of a gearbox in a remote-controlled car according to claim 1, further comprising a driving unit and a transmission assembly; said driving unit is in transmission connection with said first transmission gear through said transmission assembly for driving said first transmission gear to rotate.

8. The drive mechanism of a gearbox in a remote-controlled car according to claim 7, wherein said transmission assembly is a gear set, and a center of a driving gear of said gear set is fixedly connected to an output end of said driving unit; a driven gear of said gear set is meshed and connected to said first transmission gear.

9. The drive mechanism of a gearbox in a remote-controlled car according to claim 7, wherein said transmission assembly includes said driving gear, a first double-layer gear, a second double-layer gear, a third double-layer gear, said driven gear, and a gear shaft; said center of said driving gear is fixedly arranged at an output end of said driving unit, said gear shaft is arranged in parallel to said second shaft, said first double-layer gear and said third double-layer gear are both rotatably sheathed outside said gear shaft, and said second double-layer gear and said driven gear are both rotatably sheathed outside said second shaft; a large gear of said first double-layer gear is meshed with said driving gear, a pinion of said first double-layer gear is meshed with a large gear of said second double-layer gear, a pinion of said second double-layer gear is meshed with a large gear of said third double-layer gear, a pinion of said third double-layer gear is meshed with said driven gear, and said driven gear is meshed with said first transmission gear.

10. The drive mechanism of a gearbox in a remote-controlled car according to claim 7, further comprising a case; said transmission assembly is contained in said case; said driving unit is arranged outside said case and an output end of said driving unit passes through said case to connect said transmission assembly; said first shaft and said second shaft are both rotatably connected in said case, and at least one end of said first shaft and at least one end of said second shaft extending out of said case.

* * * * *